(12) United States Patent
Qiao

(10) Patent No.: US 7,676,630 B2
(45) Date of Patent: Mar. 9, 2010

(54) METHOD AND APPARATUS FOR USING A DETERMINED FILE ACCESS PATTERN TO PERFORM CACHING IN A FILE SYSTEM

(75) Inventor: Donghai Qiao, Reading, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 708 days.

(21) Appl. No.: 11/543,703

(22) Filed: Oct. 5, 2006

(65) Prior Publication Data

US 2008/0086600 A1    Apr. 10, 2008

(51) Int. Cl.
G06F 12/00    (2006.01)
(52) U.S. Cl. ........................... 711/118; 711/156
(58) Field of Classification Search ................. 711/118, 711/156
See application file for complete search history.

(56) References Cited

U.S. PATENT DOCUMENTS

| | | | | |
|---|---|---|---|---|
| 5,623,608 A | * | 4/1997 | Ng | 711/137 |
| 6,148,294 A | * | 11/2000 | Beyda et al. | 707/1 |
| 7,225,264 B2 | * | 5/2007 | Croman et al. | 709/232 |
| 7,383,392 B2 | * | 6/2008 | Mark et al. | 711/137 |
| 7,533,230 B2 | * | 5/2009 | Glover et al. | 711/165 |
| 2005/0132212 A1 | * | 6/2005 | Haswell | 713/193 |
| 2006/0236033 A1 | * | 10/2006 | Guinn et al. | 711/118 |
| 2007/0174551 A1 | * | 7/2007 | Cornwell et al. | 711/118 |

OTHER PUBLICATIONS

Vanderwiel, "Data Prefetch Mechanisms," ACM, vol. 32, No. 2, pp. 174-200, Jun. 2000.*

* cited by examiner

*Primary Examiner*—Stephen C Elmore
(74) *Attorney, Agent, or Firm*—Park, Vaughan & Fleming LLP

(57) ABSTRACT

A system that caches a file within a computer system. During operation, the system monitors accesses to the file, wherein the file is located on a storage device. Next, the system analyzes the monitored accesses to determine an access pattern for the file. The system then uses the determined access pattern to adjust a caching policy for the file.

23 Claims, 7 Drawing Sheets

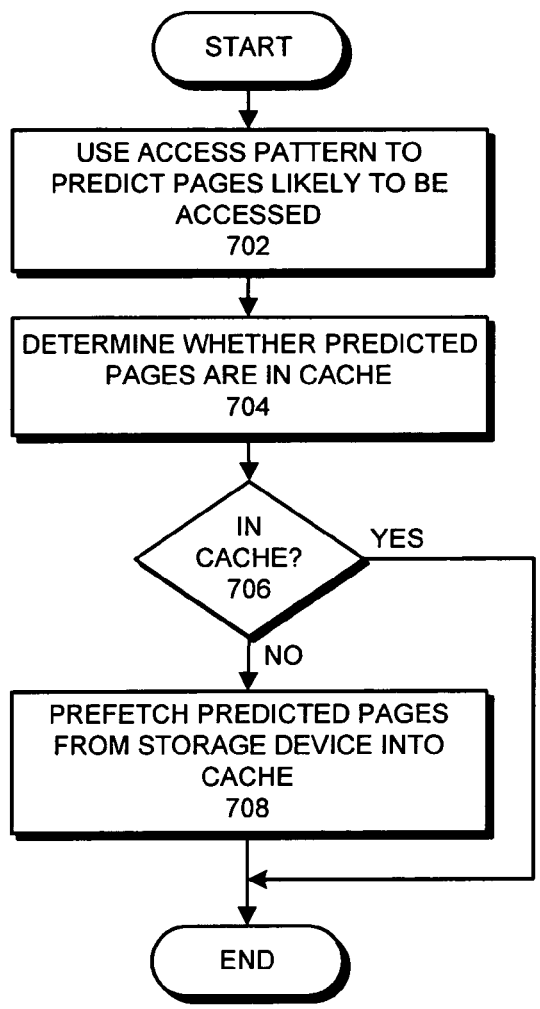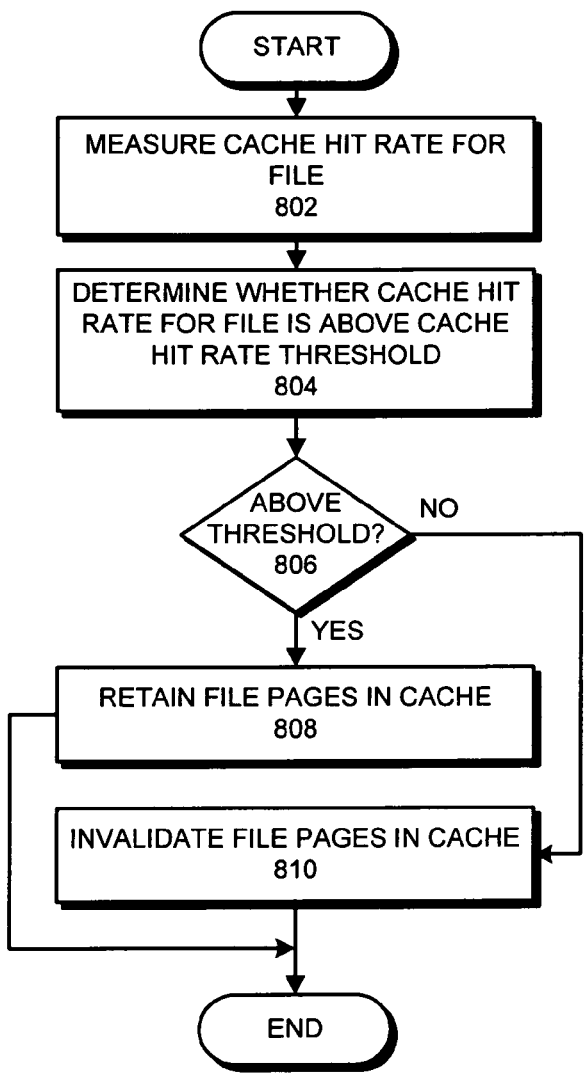
FIG. 7
FIG. 8

METHOD AND APPARATUS FOR USING A DETERMINED FILE ACCESS PATTERN TO PERFORM CACHING IN A FILE SYSTEM

BACKGROUND

1. Field of the Invention

The present invention relates to techniques for performing caching in a file system.

2. Related Art

In a typical file system, approximately 50 percent of I/O operations access less than 5 percent of the data which is accessed. Hence, if 5 percent of the most-frequently used data is cached in memory, at least half of the I/O activity can be made as fast as memory accesses.

Data caching eliminates I/O operations by caching the most-recently/most-frequently accessed data in memory and by facilitating prefetching for data that will likely be accessed in the near future. For example, pages which are allocated for database redo and rollback operations as well as log indexes and database tables will most likely be used many times. Similarly, pages that are allocated for executables or shared libraries are likely to be used frequently by many applications. In contrast, during a file copying operation, the allocated pages are most likely to be used only once regardless of whether a write operation or a read operation was performed on the page.

When caching data for a file system, it is often difficult to determine which pages should be cached because access patterns for applications can differ greatly. One solution to this problem is to use hidden Markov Models and Markov Chains to predict access patterns for files. Unfortunately, the complexity of these models makes them impractical to use.

Another solution is to examine how data is organized on the file system to predict how the data will be accessed by an application. Typically, data segments for files are well organized and fall into several categories:

(1) sequential data segments are stored sequentially from the beginning to the end. There are no gaps between sequential data segments into which data segments from other files are inserted. Examples of sequential data include digitized videos and voicemail;

(2) strided data segments are stored such that each segment is located a specified stride from the previous segment. The stride can be a fixed length or a variable-length;

(3) mapped data segments are logically mapped using a table or a table of tables;

(4) linked data segments are logically linked to each other using references. For example, a previously-read data segment can be used to determine the offset of the next data segment; and (5) random data segments can appear in any order in the file system. For example, while attempting to identify a prime number larger than any previously-determined prime number, the prime number candidates are divided by each of the previously-determined prime numbers. The order of the known prime numbers does not matter. Hence, the data segments for these prime numbers can be stored randomly on the file system.

Data is typically organized using one (or a combination) of the five techniques described above. As previously mentioned, the organization of data on the file system can indicate how the data is accessed by an application. Hence, if the data is arranged sequentially, then the access pattern will most likely be sequential. Similarly, if the data is strided, then the access pattern will most likely be strided. Furthermore, if the data is logically mapped or linked, then the access pattern will most likely be random. Unfortunately, the organization of the data for a file may not reflect the actual data access pattern.

Operating systems, such as Solaris™, typically use free memory as a system-wide cache. (Note that Solaris is a trademark or registered trademark of Sun Microsystems, Inc. in the U.S. or other countries.) However, some applications cannot take full advantage of this type of cache because their data access patterns do not match the caching policy implemented by kernel of the operation system (OS).

Solaris uses free pages in memory to cache file system data. This makes I/O operations as fast as memory accesses as long as the data that the application wants to access is located in the cache list (i.e., using page_lookup ( )). When caching a page to memory, Solaris applies one of two policies described below to all the applications system wide. Furthermore, Solaris can only choose one policy at a time.

FIG. 2A presents a block diagram illustrating a first caching policy (which corresponds to the caching policy used by Solaris when the parameter freebehind is set to 1). When an application requests a page of a file from the file system, the OS attempts to allocate a page from free page list 202 to the page requested from the file system. If there are no free pages in free page list 202, then a page from the head of cache list 204 is allocated to the page. Note that a request to access the file system can either be a read operation or a write operation.

After the application releases a page, if the page is involved in a write operation, the OS puts the page involved at the tail of cache list 204. In contrast, if the page is involved in a read operation, the OS puts the page involved at the head of cache list 204. Note that a page can also be released from cache list 204 when the page is copied to the application address space 206.

FIG. 2B presents a block diagram illustrating another caching policy. (Note that this caching policy corresponds to the caching policy in Solaris when the parameter freebehind is set to 0.) In this caching policy, all pages are retained regardless of whether they are being read from or being written to. The pages stay in the address space of the application until they are stolen for other purposes (e.g., when the kernel is out of memory). For example, after a page is allocated from cache list 202 or free page list 204 into application address space 208, a second application can "steal" pages used by the first application. These stolen pages are then allocated to another application address space 210.

When freebehind is set to 1, the life cycle of a page used in a read operation is very short because free pages are allocated from the head of the cache list. Note that applications typically experience different performance results depending on whether freebehind is set to 1 or is set to 0. In order to cache as much data as possible, freebehind is set to 0, but this can cause memory to be used up quickly.

FIG. 3 presents a block diagram illustrating a caching architecture which includes applications 302-306 and vnodes 308-312, wherein a vnode is a reference to a file on the storage device. When an application accesses a page of a file, cache list 315 is first checked to determine whether the page exists in cache list 315. If so, the page is copied to the address space of the application and the page is released from cache list 315. If the application performs a read operation on the page, then the released page is placed at the head of cache list 315. If the application performs a write operation on the page, then the released page is placed at the tail of cache list 315.

If the page requested by the application is not in cache list 315 or in the address space for the application, device driver 316 sends an I/O request to the storage device to retrieve the page from the storage device. After the page is received from the storage device, if there are free pages in the free page list, a page from the free page list is allocated to the retrieved page. Otherwise, a page from the head of cache list 315 is allocated to the retrieved page.

When the system is about to run out of physical memory, a paging daemon uses a "two-handed scanner" to scan all the physical pages, and to "steal" pages that have not been accessed/modified recently. A two-handed scanner is analogous to a two-handed clock, wherein the physical memory is represented by the face of the clock and the two hands of the scanner are set a specified distance apart in time. The leading hand clears the "reference" flag for a page. The trailing hand checks the page at a later time to determine whether the page has been referenced after the leading hand cleared the reference flag. If not, the page becomes a candidate to be freed. Hence, a page is paged out only if the page has not been referenced recently. Unfortunately, the page scanner has no information about actual access patterns. The only information it can use is the reference flag for the page regardless how these pages were used in the past.

The two-handed scanner can scan the physical page list quickly. However, it can also invalidate pages which may be reused shortly thereafter. For example, when the system is under high memory pressure, kernel level activity can be delayed. As a result page references and page modifications may not occur during this period. Instead, page references may be delayed until after the high-memory activity period. Hence, the two-handed scanner can incorrectly free pages which may be used after the high-memory activity period.

Moreover, Solaris (and other UNIX file systems) assume that the subsequent read pattern is sequential if two consecutive data blocks read from the storage device are adjacent to each other (i.e., sequential). If this pattern changes, the OS only reads one page at a time and does not prefetch pages. There are several situations that can break this pattern. For example, a file may be distributed across several threads in a process, wherein each thread of the process appears to be accessing the file locally in strided manner. However, the interleaved access stream is globally sequential. In another example, a file is shared by multiple applications, so the access pattern may be difficult to determine.

Hence, what is needed is a method and an apparatus for performing caching in a file system without the problems described above.

SUMMARY

One embodiment of the present invention provides a system that caches a file within a computer system. During operation, the system monitors accesses to the file, wherein the file is located on a storage device. Next, the system analyzes the monitored accesses to determine an access pattern for the file. The system then uses the determined access pattern to adjust a caching policy for the file.

In a variation on this embodiment, while adjusting the caching policy for the file, the system adjusts: a prefetching policy for the file, and/or a number of pages being cached for the file.

In a further variation, while using the determined access pattern to adjust the number of pages being cached for the file, the system uses the access pattern to predict which of the pages are likely to be accessed within a specified time in the future using. The system then determines whether the predicted number of pages are in the cache. If not, the system prefetches the predicted number of pages from the storage device into the cache.

In a further variation, while using the determined access pattern to adjust the prefetching policy, the system uses the determined access pattern to select a prefetching policy that corresponds to the determined access pattern. If the determined access pattern is a sequential access pattern, the prefetching policy is a sequential prefetching policy in which pages are prefetched in sequence. If the determined access pattern is a strided access pattern with a specified stride, the prefetching policy is a strided prefetching policy in which pages that are the specified stride from the previously prefetched page are prefetched. If the determined access pattern is a highly concentrated access pattern, the prefetching policy is a highly concentrated data prefetching policy in which pages within a specified neighborhood of the previously prefetched page are prefetched.

In a variation on this embodiment, while monitoring accesses to the file, the system monitors a set of input/output (I/O) addresses used to access the file.

In a further variation, while analyzing the monitored accesses to determine the access pattern for the file, the system determines a lowest address in the set of I/O addresses. For each address in the set of I/O addresses, the system calculates an offset of the address from the lowest address. Next, the system calculates a sum of the offsets. The system then calculates a ratio of the sum of the offsets to a sum of offsets for a sequential access pattern. Next, the system monitors a trend in the ratio as more addresses for the file are monitored. The system then uses the trend to determine the access pattern for the file.

In a further variation, if the trend approaches 1, the access pattern is a sequential access pattern. If the trend approaches 0, the access pattern is a highly concentrated access pattern. If the trend approaches a number greater than 1, the access pattern is a strided access pattern with a stride equal to the number greater than 1. If the trend approaches infinity, the access pattern is a random access pattern, or a strided access pattern with a variable sized stride.

In a variation on this embodiment, the system measures a cache hit rate for the file. Next, the system determines whether the cache hit rate for the file is above a cache hit rate threshold for the file. If so, the system retains file pages in the cache that have been released. Otherwise, the system invalidates file pages in the cache that have been released.

In a further variation, the system readjusts the allocation of cache resources by: comparing performance metrics for a current allocation of cache resources between the file and a second file to determine whether cache resources are being used efficiently between the file and the second file; and if not, readjusting the allocation of cache resources between the file and the second file.

In a further variation, while comparing the performance metrics, the system compares the cache hit rate and the number of pages cached for the file to the cache hit rate and the number of pages cached for the second file. If the cache hit rate for the file is greater than the cache hit rate for the second file, and if the number of pages cached for the file is less than the number of pages cached for the second file, the system reduces the cache hit rate threshold for the file so that more pages from the file are cached, and increases a cache hit rate threshold for the second file so that less pages from the second file are cached.

In a further variation, the allocation of cache resources is readjusted in response to a specified event, which can include:

an expiration of a current time window, a new file being opened, a open file being closed, and a system administration command.

BRIEF DESCRIPTION OF THE FIGURES

FIG. 7 presents a flow chart illustrating the process of determining prefetching pages for a file in accordance with an embodiment of the present invention.

FIG. 8 presents a flow chart illustrating the process of determining whether to retain a page in the cache in accordance with an embodiment of the present invention.

DETAILED DESCRIPTION

Figure 1:
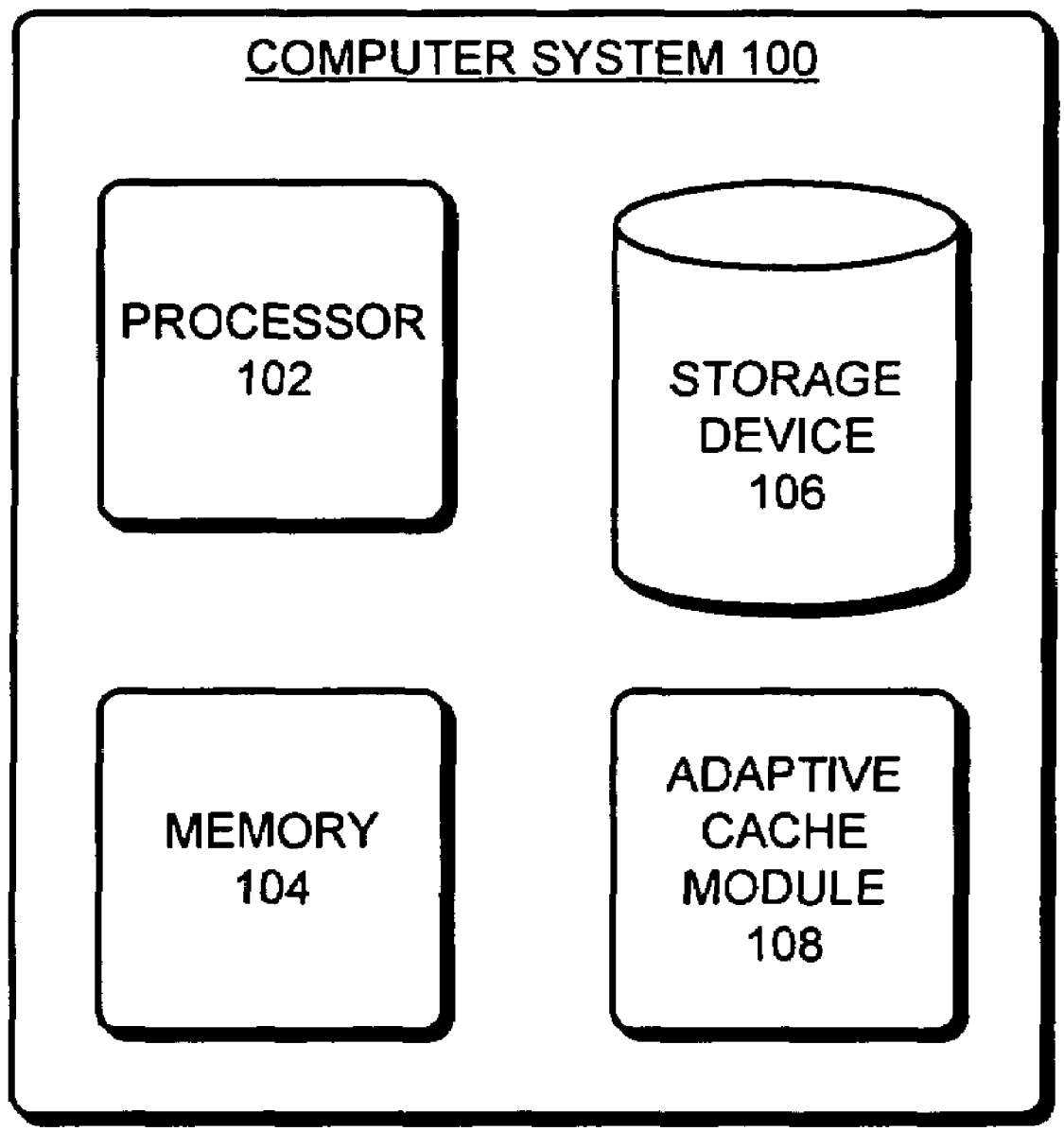
FIG. 1 presents a block diagram illustrating a computer system in accordance with an embodiment of the present invention.
Figure 2A:
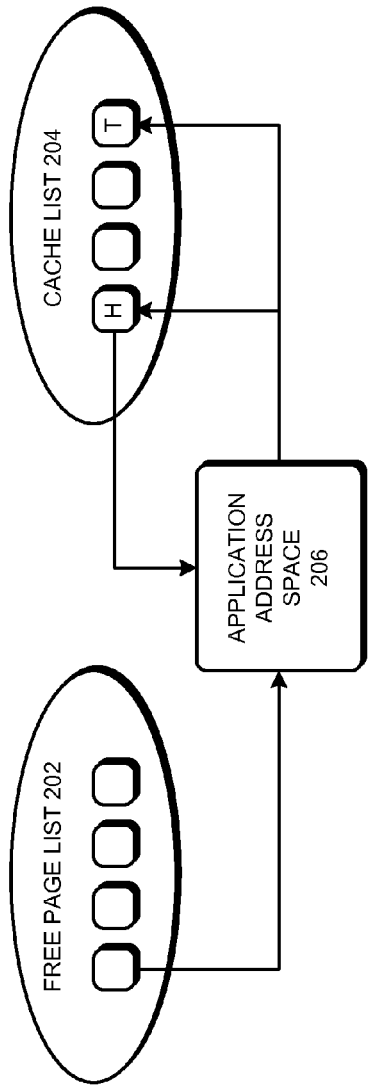
FIG. 2A presents a block diagram illustrating a page caching policy.
Figure 2B:
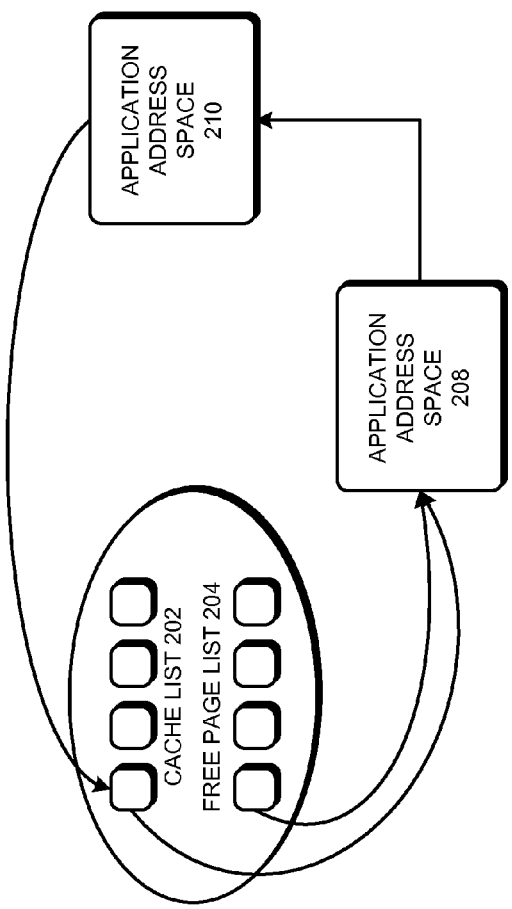
FIG. 2B presents a block diagram illustrating another page caching policy.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides an adaptive data caching mechanism. This adaptive data caching mechanism addresses two aspects of caching a file: (1) prefetching pages, and (2) caching pages. As previously mentioned, hidden Markov Models, Markov Chains, and probability analysis can be used to predict access patterns for files. However, due to the wide range of the applications and their corresponding data access patterns, a potential state explosion can result when using a Markov Chain. Hence, these techniques are not practical when applied to commercial operating systems. One embodiment of the present invention avoids using these inefficient techniques by using statistical analysis to determine an access pattern for files in the file system, measuring cache hit rates, and readjusting the caching policy.

In one embodiment of the present invention, during a measurement phase, statistics gathered about the access patterns for the files are used to predict which pages should be prefetched and which pages should be retained in the cache. In one embodiment of the present invention, during the measurement phase, the system makes decisions as to whether a readjustment is required based on a state of an application and the trend of a global cache hit rate. In one embodiment of the present invention, during a readjustment phase, the system determines which caching policy to choose, and readjusts the caching parameters for a given file. In one embodiment of the present invention, the adaptive caching mechanism continuously monitors the access patterns of files and makes changes to the caching policy based on the dynamic access pattern for the files.

One embodiment of the present invention provides a mechanism for gathering statistics about the access pattern for a file. Another embodiment of the present invention provides a mechanism for measuring the cache hit rate for a file. Another embodiment of the present invention provides a mechanism for readjusting the caching policy for a file. Note that when the cache hit rate for a given file is improved, the system-wide cache hit rate is also improved.

In one embodiment of the present invention, the new data caching mechanism adapts to changing access patterns. When the access pattern changes, the cache policy is changed and cache resources are reallocated to improve the overall cache hit rate.

In one embodiment of the present invention, the adaptive caching mechanism is built upon the current cache list and free list implementation in the Solaris™ operating system.

In one embodiment of the present invention, a write operation is delayed until the system has enough I/O bandwidth to complete the write operation. In contrast, a read operation is given a higher priority since efficient read operations can reduce I/O latency and increase the system-wide cache hit rates.

In one embodiment of the present invention, the identified access pattern is saved as one of the attributes of a file. When this file is reopened, this access pattern information is used to select a caching policy for the file.

Computer System

FIG. 1 presents a block diagram illustrating a computer system 100 in accordance with an embodiment of the present invention. Computer system 100 includes processor 102, memory 104, storage device 106, and adaptive cache module 108. Note that adaptive cache module 108 is described in more detail in reference to FIGS. 4-9 below.

Processor 102 can generally include any type of processor, including, but not limited to, a microprocessor, a mainframe computer, a digital signal processor, a personal organizer, a device controller and a computational engine within an appliance. Storage device 106 can include any type of non-volatile storage device that can be coupled to a computer system. This includes, but is not limited to, magnetic, optical, and magneto-optical storage devices, as well as storage devices based on flash memory and/or battery-backed up memory.

Adaptive Caching Architecture

Figure 3:
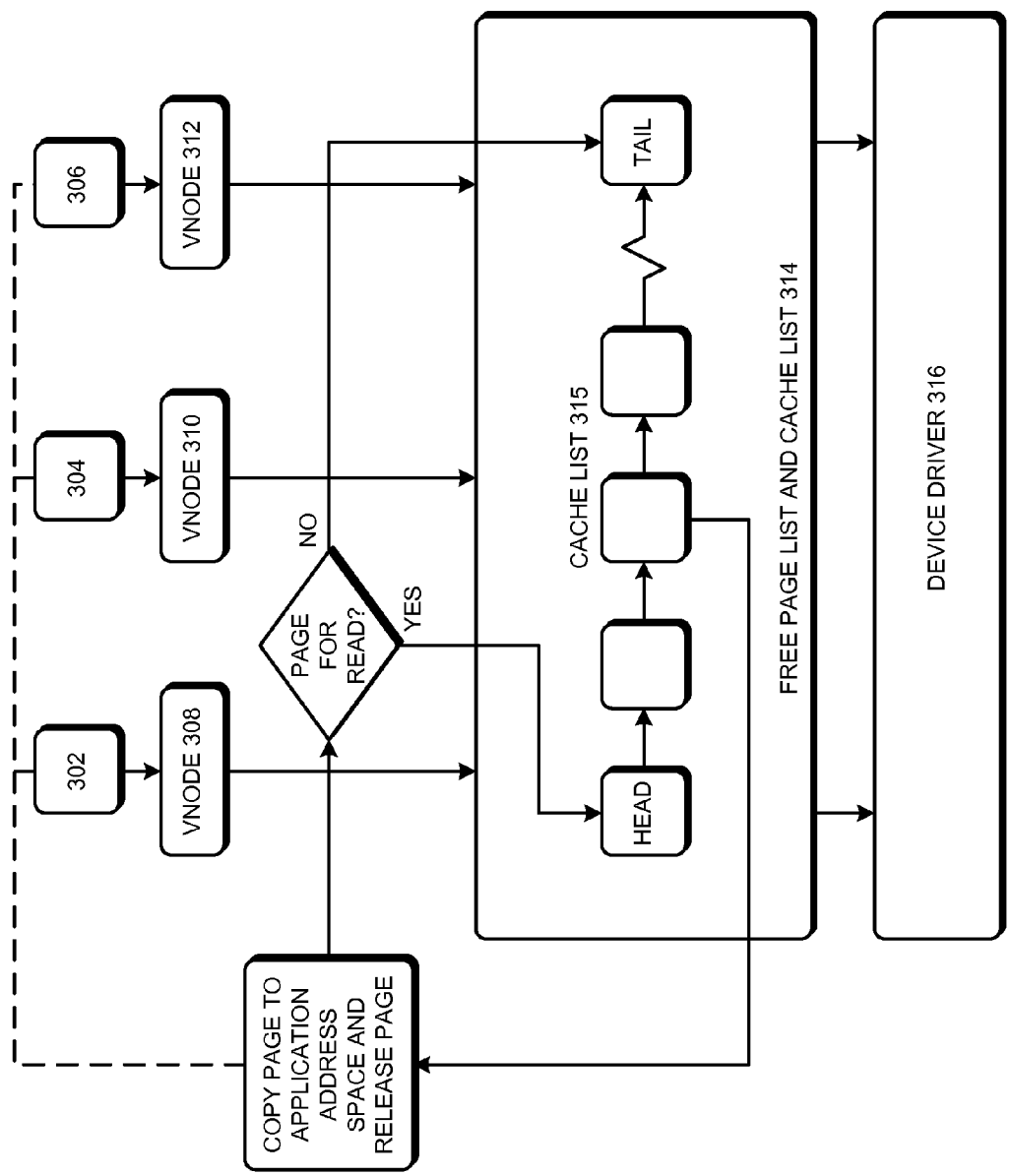
FIG. 3 presents a block diagram illustrating a caching architecture.
Figure 4:
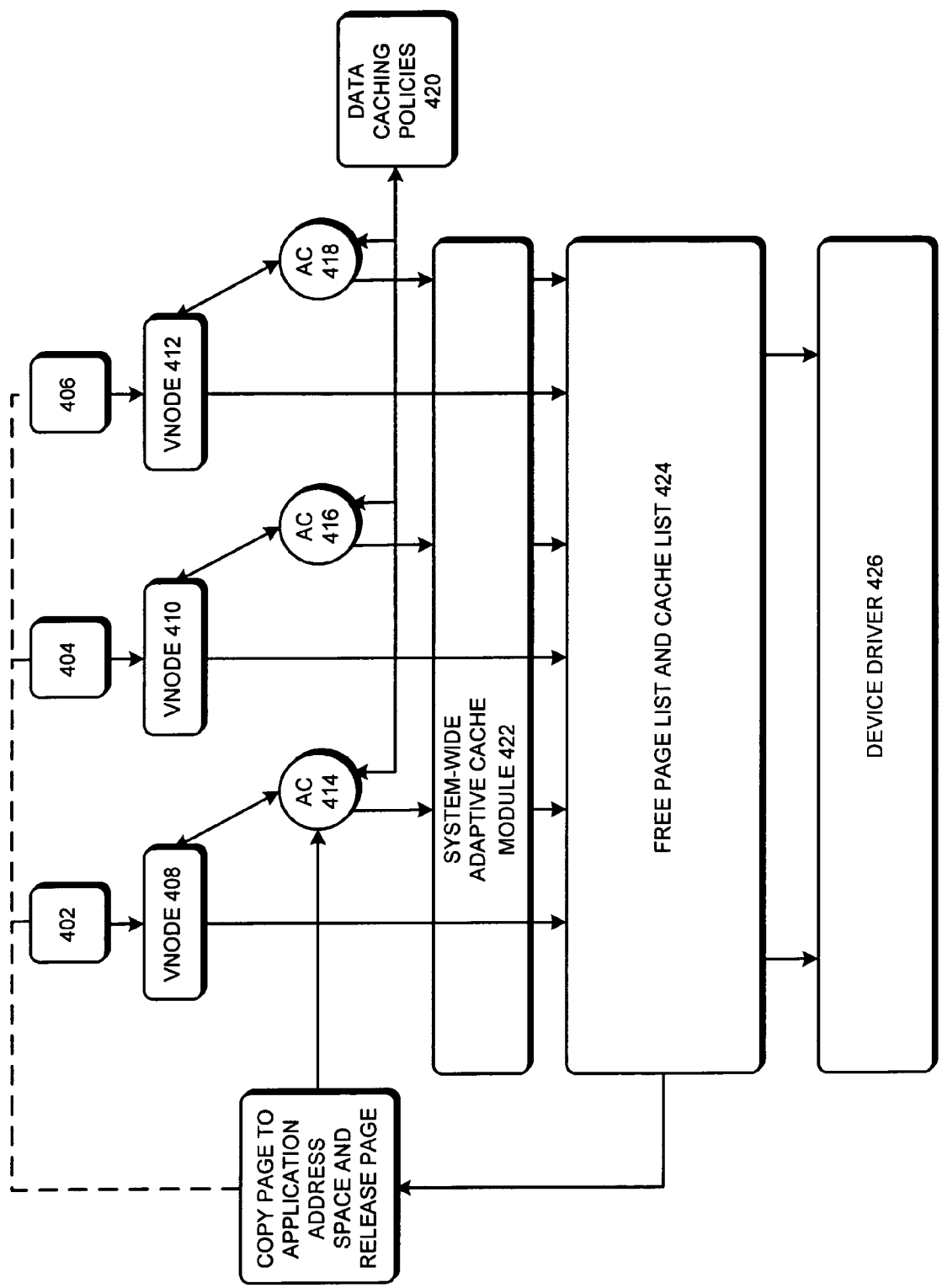
FIG. 4 presents a block diagram illustrating an adaptive caching architecture in accordance with an embodiment of the present invention.

FIG. 4 presents a block diagram illustrating an adaptive caching architecture in accordance with an embodiment of the present invention. FIG. 4 includes applications 402-406, which are associated with vnodes 408-412, respectively. Vnodes 408-412 are coupled to adaptive caching modules 414-418, respectively, which use data caching policies 420 to manage the caching of pages for files that are associated with applications 402-406. In one embodiment of the present invention, adaptive caching modules 414-418 determine the access pattern and the cache hit rates for files associated with applications 402-406, respectively. In one embodiment of the present invention, system-wide adaptive caching module 422 receives information about files for applications 402-406 and maintains global-level statistics about these files. The operation of free page list and cache list 424 is similar to free page list and cache list 314 in FIG. 3. The only difference is that adaptive caching modules 414-418 and system-wide adaptive caching module 422 determine which pages for the files are prefetched and cached.

The operation of adaptive caching modules 414-418, and system-wide adaptive caching module 422 is described in more detail below.

DEFINITIONS

The following definitions are presented to aid in the discussion of the adaptive caching mechanism:

$F_{size}(f)$ represents the length of a file f;

$P_{free}$ represents the number of free pages and is determined dynamically;

IO represents the total number of I/O requests being made system wide, whereas IO(f) represents the total number of I/O requests for a particular file f;

RD represents the total number of pages being read system wide, whereas RD(f) represents the total number of pages being read from a particular file f;

Cach(f) represents the total number of pages cached for a particular file f;

W[ ] is an array of windows used to observe system-wide file access activity, whereas $W_f[\ ]$ is an array of windows used to observe file access activity for a given file f;

$W_{size}$ represents the number of windows in W[ ] or $W_f[\ ]$. W[0] is the first window, W[$W_{size}$−1] is the last window; and QT(f) represents the quota for f and indicates the number of pages that will be used for data caching for this particular file f before readjustment for this file can start.

Note that it is assumed that $W_{size} \ll P_{free}$.

Hence, for any file f, the following can be derived:

(1) the number of times that the cache is hit is IO(f)−RD(f);

(2) the number of pages allocated for other use is RD(f)−Cach(f);

(3) IO=ΣIO(f); and (4) RD=ΣRD(f).

The page reclaim rate, $p_f$, is the probability that a page will be in the cache. $p_f$ is defined as:

$$\frac{IO(f) - RD(f)}{IO(f)}$$

An array W[ ] is used to observe the trend of the system-wide cache hit rate. In one embodiment of the present invention, a single observation window W[i] can record data including, but not limited to: the window size (e.g., 1000 consecutive I/O's system wide); the number of I/O activities being carried out system wide (i.e., IO); the number of read requests being issued system wide; the number of read requests actually being carried out system wide (i.e., RD); and the total amount of time elapsed in the window.

In one embodiment of the present invention, for each file, an array of windows $W_f[\ ]$ is used to track the trend of cache hit rates for the file f. In one embodiment of the present invention, the data that a single observation window $W_f[i]$ can record includes, but is not limited to: the number of I/O operations being carried out for file f (i.e., IO(f)); the number of read requests being issued for file f; the number of read requests actually being carried out for file f (i.e., RD(f)); the number of pages cached for this file (i.e., Cach(f)); and the gap between the largest offset and smallest offset of data blocks read in this window.

An Adaptive Data Caching Algorithm

One embodiment of the present invention prefetches pages that are expected to be accessed shortly thereafter. The prefetched pages are cached in virtual memory and, the effect of the prefetch operation is reflected almost immediately in the cache hit rates. One embodiment of the present invention identifies the access pattern dynamically, and selects a prefetching policy based on the access pattern. Another embodiment of the present invention measures the cache rate for each file I/O activity and the system-wide cache hit rate. The number of pages being cached for each individual file is readjusted based on this measurement. Note that an adjustment of the caching policy for a file changes the cache distribution, and therefore, changes the cache hit rates for the other files in the system. Hence, the effect of changing the caching policy for a given file can be measured through the system-wide cache hit rate immediately. In one embodiment of the present invention, if a trend to the caching policy for a file increases the system-wide cache hit rate, then the change is committed. Otherwise, the caching policies for other files are adjusted until the adjustment produces a positive increase in the system-wide cache hit rate.

Identify Access Pattern

Figure 5:
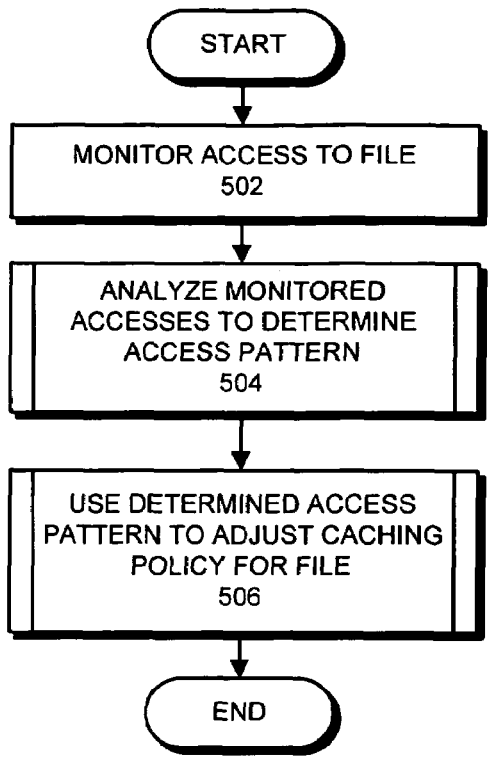
FIG. 5 presents a flow chart illustrating the process of caching a file within a computer system in accordance with an embodiment of the present invention.

One embodiment of the present invention examines consecutive offsets of I/O operations to identify an access pattern for a file. The access pattern is then used to determine a prefetching policy for the file. FIG. 5 presents a flow chart illustrating the process of caching blocks of a file within a computer system in accordance with an embodiment of the present invention. The process begins when the system monitors accesses to the file, wherein the file is located on a storage device (step 502). Next, the system analyzes the monitored accesses to determine an access pattern for the file (step 504). (Step 504 is described in more detail in reference to FIG. 6 below.) The system then uses the determined access pattern to adjust a caching policy for the file (step 506). (Step 506 is described in more detail in reference to FIG. 7 below.)

For example, let $a_1, a_2, \ldots, a_n$ be number of n addresses observed through n consecutive I/O activities, $a = \min(a_1, a_2, \ldots, a_n)$, and B be the disk block size. Then the sum of offsets from the lowest address (i.e., a) is:

$$\sum (a_i - a) = (a_1 - a) + (a_2 - a) + \ldots + (a_n - a)$$
$$= \sum a_i - n^* a$$

If the access pattern is in sequential, then the sum of offsets is:

$$\sum (a_i - a) = 0 + B + 2B + 3B + \ldots nB = \frac{nB(n-1)}{2}$$

$$= \frac{nB(n-1)}{2}$$

Let $$S_n = \frac{nB(n-1)}{2}.$$

The value $$d = \sum \frac{(a_i - a)}{S_n}$$

is examined as n approaches infinity.

d can then be analyzed to make the following conclusions for a given file:
  (1) If d approaches 1 quickly, then the access pattern for the file may be sequential.
  (2) If d approaches 0, then the data may be highly reusable, and a high caching rate is likely to be observed for the given file. If the access pattern is random, then this random mode is constringent. For highly-reusable data, increasing the cache hit rate for the file is beneficial. The cache hit rate for a file can be increased by increasing the quota for the file and by decreasing the cache hit rate threshold for the file.
  (3) If d approaches a number greater than 1, then the access pattern is strided, wherein the stride is the number greater than 1. For example, if d approaches 5, then the stride is 5.
  (4) If d approaches infinity, then the access pattern is likely a variable-sized stride such that prefetching is difficult to predict. If the access pattern is random and the access pattern is not constringent, the cache hit rates are expected to be very low. Hence, caching pages for files with random access patterns are avoided in favor of caching pages for files with more reusable data or more predictable data access patterns.

Figure 6:
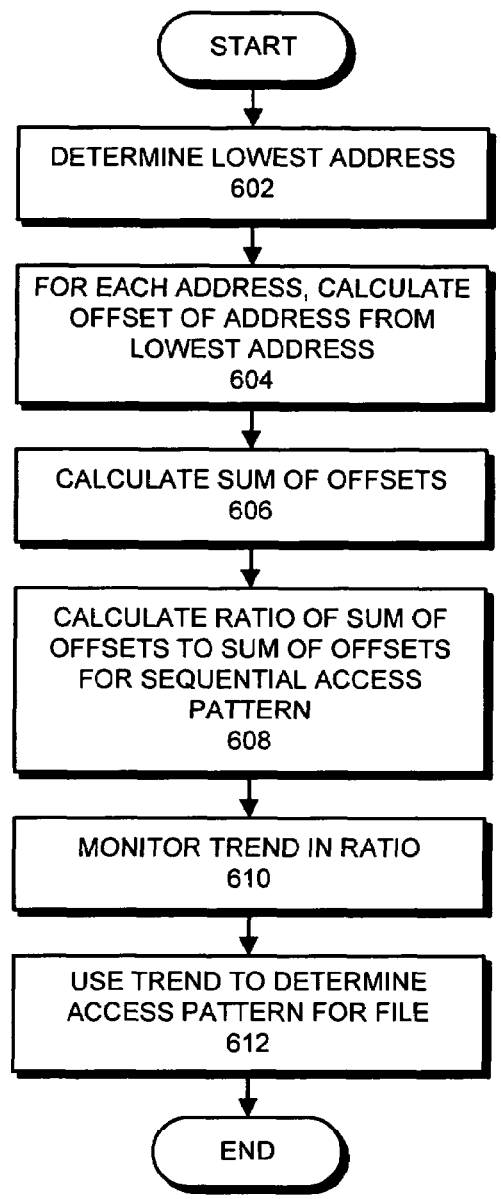
FIG. 6 presents a flow chart illustrating the process of monitoring accesses to the file system in accordance with an embodiment of the present invention.

FIG. 6 presents a flow chart summarizing the above-described process of monitoring accesses to the file system in accordance with an embodiment of the present invention. The process begins when the system determines a lowest address in the set of I/O addresses (step 602). For each address in the set of I/O addresses, the system calculates an offset of the address from the lowest address (step 604). Next, the system calculates a sum of the offsets (step 606). The system then calculates a ratio of the sum of the offsets to a sum of offsets for a sequential access pattern (step 608). Next, the system monitors a trend in the ratio as more addresses for the file are monitored (step 610). The system then uses the trend to determine the access pattern for the file (step 612).

The cost of calculating $\Sigma(a_i-a)$ should be considered. Let $A_n=(a_1-a)+(a_2-a)+\ldots+(a_n-a)$, $A_{n+1}=(a_1-a)+(a_2-a)+\ldots+(a_n-a)+(a_{n+1}-a)$, and $a'=\min(a, a_{n+1})$. Then $A_{n+1}=A_n+a_{n+1}+n(a-a')-a'$. Hence, if the previous $A_n$ is saved, then the cost of calculating $\Sigma(a_i-a')$ can be ignored because only a few arithmetic operations are needed.

In one embodiment of the present invention, after the access pattern for the file is determined, pages that are expected to be used shortly thereafter are prefetched into the cache. If the pages are already in the cache list, they are retained for later use. FIG. 7 presents a flow chart illustrating the process of adjusting pages being cached for a file in accordance with an embodiment of the present invention. The process begins when the system uses the access pattern to predict the number of pages of the file that are likely to be accessed (step 702). Next, the system determines whether the predicted number of pages for the file are in a cache (step 704). If not (step 706—no), the system prefetches the predicted number of pages from the storage device into the cache (step 708).

Calculating the Quota for an Initially Opened File

Typically, larger files need more pages cached. Hence, for larger files, the page quota for a file is increased. However, since the size of files can vary substantially (e.g., from several kilobytes to several terabytes), a quota for a file cannot be allocated in proportion to the size of the file. There are several techniques for setting a quota for a file. One embodiment of the present invention sets the quota, QT, for a file f as follows:

$$QT(f) = \frac{P_{free} \cdot f_{size}}{\sum f_{size}} \cdot C \quad (1)$$

$$\text{where } f_{size} = \log(F_{size}) \quad (2)$$

and C is a constant, and can be tuned as needed. For example, let:

$$C = 0.618. \quad (3)$$

Measure the Cache Rate

Let $p_f$ stands for the cache hit rate threshold for each f, such that when:

$$\frac{IO(f) - RD(f)}{IO(f)} < p_f \quad (4)$$

pages are put at the head of the cache list when they are released. Otherwise, pages are put at the tail of the cache list. In one embodiment of the present invention, the threshold $p_f$ is saved as a parameter of file f, and can be used when file f is reopened.

FIG. 8 presents a flow chart summarizing the above-described process of determining whether to retain a page in the cache or to invalidate a page in the cache in accordance with an embodiment of the present invention. The process begins when the system measures a cache hit rate for the file (step 802). Next, the system determines whether the cache hit rate for the file is above a cache hit rate threshold for the file (step 804). If so (step 806—yes), the system retains file pages in the cache that have been released (step 808). Otherwise (step 808—no), the system invalidates file pages in the cache that have been released (step 810).

Note that when retaining and invalidating pages in the cache, the present invention uses the existing technique used in Solaris and other Unix file systems. Specifically, when the system determines that a page should be retained in the cache, the page is put at the tail of the cache list so that it will remain in the cache for a long time. In contrast, when the system determines that a page should be invalidated, the page is put at the head of the cache list or is put in the free page list. In doing so, the block of member allocated for the invalidated page has a short lifetime and may be used for other purposes shortly thereafter.

Since $$\frac{IO(f) - RD(f)}{IO(f)}$$

is the probability of cache hit rates, and $$\frac{IO(f)}{IO}$$

is the probability of I/O distributed on this file, the probability of cache hit rates system wide is:

$$P = \sum \frac{IO(f) - RD(f)}{IO(f)} \cdot \frac{IO(f)}{IO} \quad (5)$$

$$= \sum \frac{IO(f) - RD(f)}{IO}$$

$$= \frac{\sum IO(f) - \sum RD(f)}{IO}$$

$$= \frac{IO - RD}{IO}.$$

Thus, each initially-opened file has a cache hit rate of P. When:

$$\frac{IO(f) - RD(f)}{IO(f)} < P$$

pages go to the head of the cache list when the page is released. Otherwise, pages go to the tail of the cache list. However, the actual cache hit rates can change due to uncertain factors, such as the length of the cache list and the behavior of the application associated with the opened file over time. Hence, one embodiment of the present invention adjusts the initially assigned probability P to increase the system-wide cache hit rate.

Let $$p_f = \frac{IO(f_i) - RD(f_i)}{IO(f_i)} \cdot \frac{IO(f_i)}{IO} \quad (6)$$

$$= \frac{IO(f_i) - RD(f_i)}{IO}$$

where $P_{f1} > P_{f2} > \ldots > P_{fn}$ (7)

The goal is to get the largest cache hit rate P, where P is:

$$P = \sum P_{fi} = \frac{IO - RD}{IO}$$

Re-Adjusting the Quota and Selecting Candidates

The above analysis did not account for Cach(f). Hence, $p_{fi}$ is recalculated to account for Cach($f_i$):

$$p'_{f1} = \frac{IO(f_1) - RD(f_1)}{Cach(f_1)}, \ldots, p'_{fn} = \frac{IO(f_n) - RD(f_n)}{Cach(f_n)}.$$

Note that $p_{f1}', \ldots, p_{fn}'$ is not likely in the same order as the order presented in equation (7). Now consider Cach(f) for each f:

$$Cach(f_1), Cach(f_2), \ldots, Cach(f_n). \quad (8)$$

If there exists an i in equation (7), such that $P_{fi} > P_{fi+1}$ and $Cach(f_i) > Cach(f_{i+1})$, cache resources are being used efficiently. However, if $P_f > P_{fi+1}$, but $Cach(f_i) < Cach(f_{i+1})$, file $f_{i+1}$ uses more cache resources, but caches less reuseable data than $f_i$ does.

Let $c_1 = Cach(f_2) - Cach(f_1)$, $c_2 = Cach(f_3) - Cach(f_2)$, ..., $c_{n1} = Cach(f_n) - Cach(f_n-1)$, and $c_n = Cach(f_1) - Cach(f_n)$. In order to make this technique more efficient $c_k$, is chosen such that $c_k = \max(c_1, c_2, \ldots, c_n)$, where $1 \leq k \leq n$. If $P_{fk} > P_{fk+1}$ and $c_k > 0$, then $p_{fk}$ and $p_{fk+1}$ need to be adjusted. (Recall that $p_{fk}$ and $p_{fk+1}$ are the cache hit rate thresholds for $f_k$ and $f_{k+1}$). The cache hit rate threshold $p_{k+1}$ is increased and threshold $p_{fk}$ is decreased. The result of these adjustments increases the number of pages cached for file $f_k$, and reduces the number of pages cached for file $f_{k+1}$, thereby improving the system-wide cache hit rate.

If the cases above are not observed, then the following is examined:

$$C_1 = \frac{IO(f_1) - RD(f_1)}{Cach(f_1)}, C_2 = \frac{IO(f_2) - RD(f_2)}{Cach(f_2)},$$

$$\ldots, C_n = \frac{IO(f_n) - RD(f_n)}{Cach(f_n)}.$$

Assume that $C_1 = \max(C_1, C_2, \ldots, C_n)$ and $C_n = \min(C_1, C_2, \ldots, C_n)$. This means relatively more Cach($f_n$) is used, but the caching is done on less reuseable data. Hence, the threshold for file $f_n$ is increased and the quota for file $f_n$ is reduced, thereby reducing Cach($f_n$). At the same time, the threshold for file $f_1$ is reduced and the quota for file $f_1$ is increased, thereby increasing Cach($f_1$).

Figure 9:
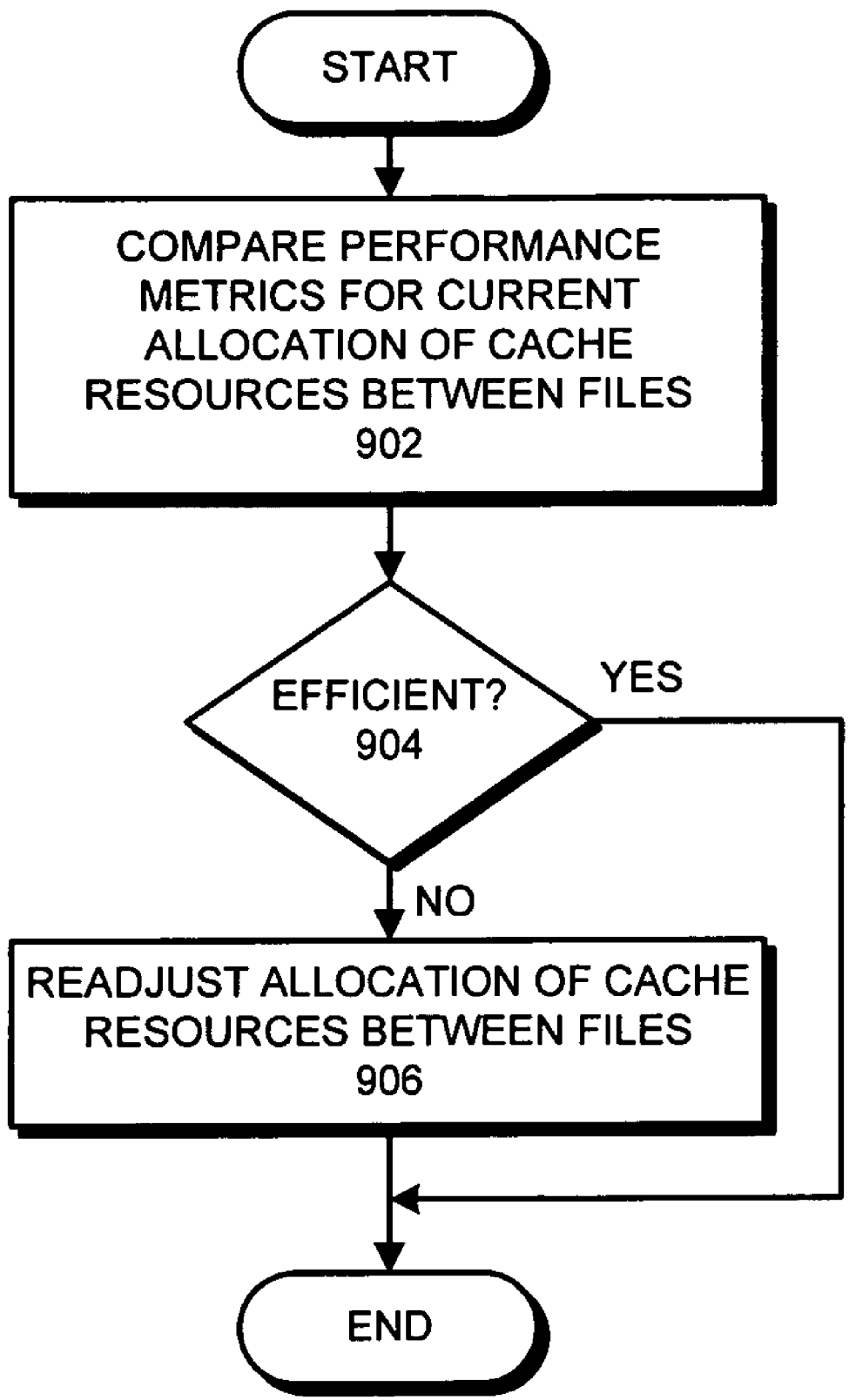
FIG. 9 presents a flow chart illustrating the process of readjusting the allocation of cache resources in accordance with an embodiment of the present invention.

FIG. 9 presents a flow chart summarizing the above-described process of readjusting the allocation of cache resources in accordance with an embodiment of the present invention. The process begins when the system compares the performance metrics involves comparing the cache hit rate and the number of pages cached for the file to the cache hit rate and the number of pages cached for the second file (step 902). If the cache resources are not being used efficiently (step 904—no), the system readjusts the allocation of cache resources between the files (step 906).

Re-Adjustment and Measurement

In one embodiment of the present invention, the caching policy is readjusted in several situations, including, but not limited to, when: a current observation window expires, a new file is opened, an opened file is closed, or system/performance administration command is executed.

The measurement is done on each individual I/O activity. However, as discussed above, the cost for these calculations is very low (i.e., a few additional arithmetic operations). The items calculated for each I/O operation are:

(1) IO(f)=IO(f)+1 when an I/O to file f is issued;
(2) RD(f)=RD(f)+1 when a read is actually issued through the device driver from file f;
(3) Cach(f)=Cach(f)+1 when a page is allocated for file f from the cache list; and
(4) Cach(f)=Cach(f)−1 whenever a page is de-allocated from the cache list, the data cached in this page for file f is invalid, so the number of pages cached for file f decreases.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for caching a file within a computer system, comprising:
    monitoring accesses to the file, wherein the file is located on a storage device;
    analyzing the monitored accesses to determine an access pattern for the file
    using the determined access pattern to adjust a caching policy for the file; and
    using the caching policy to store one or more pages for the file in a cache.

2. The method of claim 1, wherein adjusting the caching policy for the file involves adjusting:
    a prefetching policy for the file; and/or
    a number of pages being cached for the file.

3. The method of claim 2, wherein using the determined access pattern to adjust a number of pages being cached for the file involves:
    using the access pattern to predict which of the pages are likely to be accessed within a specified time in the future;
    determining whether the predicted number of pages for the file are in a cache; and
    if not, prefetching the predicted number of pages from the storage device into the cache.

4. The method of claim 2,
    wherein using the determined access pattern to adjust the prefetching policy involves using the determined access pattern to select a prefetching policy that corresponds to the determined access pattern;
    wherein if the determined access pattern is a sequential access pattern, the prefetching policy is a sequential prefetching policy in which pages are prefetched in sequence;
    wherein if the determined access pattern is a strided access pattern with a specified stride, the prefetching policy is a strided prefetching policy in which pages that are the specified stride from the previously-prefetched page are prefetched; and
    wherein if the determined access pattern is a highly-concentrated access pattern, the prefetching policy is a highly-concentrated data prefetching policy in which pages within a specified neighborhood of the previously-prefetched page are prefetched.

5. The method of claim 1, wherein monitoring accesses to the file involves monitoring a set of input/output (I/O) addresses used to access the file.

6. The method of claim 5, wherein analyzing the monitored accesses to determine the access pattern for the file involves:
    determining a lowest address in the set of I/O addresses;
    for each address in the set of I/O addresses, calculating an offset of the address from the lowest address;
    calculating a sum of the offsets;
    calculating a ratio of the sum of the offsets to a sum of offsets for a sequential access pattern;
    monitoring a trend in the ratio as more addresses for the file are monitored; and
    using the trend to determine the access pattern for the file.

7. The method of claim 6,
    wherein if the trend approaches 1, the access pattern is a sequential access pattern;
    wherein if the trend approaches 0, the access pattern is a highly-concentrated access pattern;
    wherein if the trend approaches a number greater than 1, the access pattern is a strided access pattern with a stride equal to the number greater than 1; and
    wherein if the trend approaches infinity, the access pattern is:
        a random access pattern; or
        a strided access pattern with a variable-sized stride.

8. The method of claim 1, wherein the method further comprises:
    measuring a cache hit rate for the file;
    determining whether the cache hit rate for the file is above a cache-hit-rate threshold for the file;
    if so, retaining file pages in the cache that have been released; and
    otherwise, invalidating file pages in the cache that have been released.

9. The method of claim 8, wherein the method further comprises:
    readjusting the allocation of cache resources by:
        comparing performance metrics for a current allocation of cache resources between the file and a second file to determine whether cache resources are being used efficiently between the file and the second file; and
        if not, readjusting the allocation of cache resources between the file and the second file.

10. The method of claim 9,
    wherein comparing the performance metrics involves comparing the cache hit rate and the number of pages cached for the file to the cache hit rate and the number of pages cached for the second file; and
    wherein if the cache hit rate for the file is greater than the cache hit rate for the second file, and if the number of pages cached for the file is less than the number of pages cached for the second file, the method further comprises:
        reducing the cache hit rate threshold for the file so that more pages from the file are cached; and
        increasing a cache hit rate threshold for the second file so that less pages from the second file are cached.

11. The method of claim 9,
    wherein the allocation of cache resources is readjusted in response to a specified event; and
    wherein the specified event can include:
        an expiration of a current time window;
        a new file being opened;
        a open file being closed; and
        a system administration command.

12. A computer-readable storage medium storing instructions that when executed by a computer cause the computer to perform a method for caching a file within a computer system, wherein the method comprises:

monitoring accesses to the file, wherein the file is located on a storage device;

analyzing the monitored accesses to determine an access pattern for the file;

using the determined access pattern to adjust a caching policy for the file; and using the caching policy to store one or more pages for the file in a cache.

13. The computer-readable storage medium of claim 12, wherein adjusting the caching policy for the file involves adjusting:

a prefetching policy for the file; and/or a number of pages being cached for the file.

14. The computer-readable storage medium of claim 13, wherein using the determined access pattern to adjust a number of pages being cached for the file involves:

using the access pattern to predict which of the pages are likely to be accessed within a specified time in the future;

determining whether the predicted number of pages for the file are in a cache; and if not, prefetching the predicted number of pages from the storage device into the cache.

15. The computer-readable storage medium of claim 13, wherein using the determined access pattern to adjust the prefetching policy involves using the determined access pattern to select a prefetching policy that corresponds to the determined access pattern;

wherein if the determined access pattern is a sequential access pattern, the prefetching policy is a sequential prefetching policy in which pages are prefetched in sequence;

wherein if the determined access pattern is a strided access pattern with a specified stride, the prefetching policy is a strided prefetching policy in which pages that are the specified stride from the previously-prefetched page are prefetched; and wherein if the determined access pattern is a highly-concentrated access pattern, the prefetching policy is a highly-concentrated data prefetching policy in which pages within a specified neighborhood of the previously-prefetched page are prefetched.

16. The computer-readable storage medium of claim 12, wherein monitoring accesses to the file involves monitoring a set of input/output (I/O) addresses used to access the file.

17. The computer-readable storage medium of claim 16, wherein analyzing the monitored accesses to determine the access pattern for the file involves:

determining a lowest address in the set of I/O addresses;

for each address in the set of I/O addresses, calculating an offset of the address from the lowest address;

calculating a sum of the offsets;

calculating a ratio of the sum of the offsets to a sum of offsets for a sequential access pattern;

monitoring a trend in the ratio as more addresses for the file are monitored; and using the trend to determine the access pattern for the file.

18. The computer-readable storage medium of claim 17, wherein if the trend approaches 1, the access pattern is a sequential access pattern;

wherein if the trend approaches 0, the access pattern is a highly-concentrated access pattern;

wherein if the trend approaches a number greater than 1, the access pattern is a strided access pattern with a stride equal to the number greater than 1; and wherein if the trend approaches infinity, the access pattern is:

a random access pattern; or a strided access pattern with a variable-sized stride.

19. The computer-readable storage medium of claim 12, wherein the method further comprises:

measuring a cache hit rate for the file;

determining whether the cache hit rate for the file is above a cache-hit-rate threshold for the file;

if so, retaining file pages in the cache that have been released; and otherwise, invalidating file pages in the cache that have been released.

20. The computer-readable storage medium of claim 19, wherein the method further comprises:

readjusting the allocation of cache resources by:

comparing performance metrics for a current allocation of cache resources between the file and a second file to determine whether cache resources are being used efficiently between the file and the second file; and if not, readjusting the allocation of cache resources between the file and the second file.

21. The computer-readable storage medium of claim 20, wherein comparing the performance metrics involves comparing the cache hit rate and the number of pages cached for the file to the cache hit rate and the number of pages cached for the second file; and wherein if the cache hit rate for the file is greater than the cache hit rate for the second file, and if the number of pages cached for the file is less than the number of pages cached for the second file, the method further comprises:

reducing the cache hit rate threshold for the file so that more pages from the file are cached; and increasing a cache hit rate threshold for the second file so that less pages from the second file are cached.

22. The computer-readable storage medium of claim 20, wherein the allocation of cache resources is readjusted in response to a specified event; and wherein the specified event can include:

an expiration of a current time window;

a new file being opened;

a open file being closed; and a system administration command.

23. An apparatus that caches a file within a computer system, comprising:

a processor;

a memory;

a storage device;

a cache; and an adaptive cache module configured to:

monitor accesses to the file, wherein the file is located on the storage device;

analyze the monitored accesses to determine an access pattern for the file; and to use the determined access pattern to adjust a caching policy for the file.

* * * * *